Dec. 14, 1937.  G. B. MARKLE, JR  2,102,542
DEVICE FOR HOLDING FOWLS AND THE LIKE
Filed Feb. 11, 1937
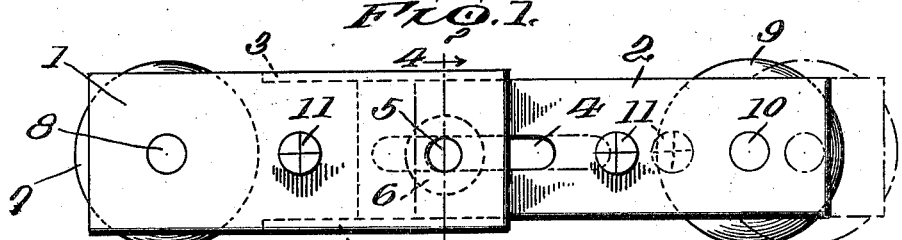
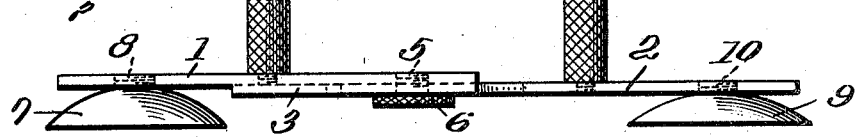
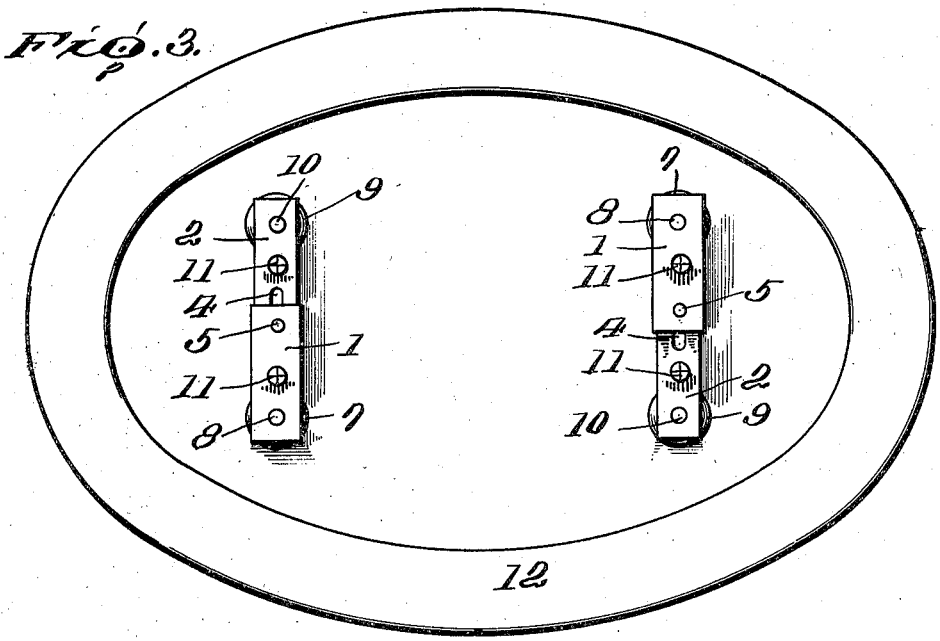
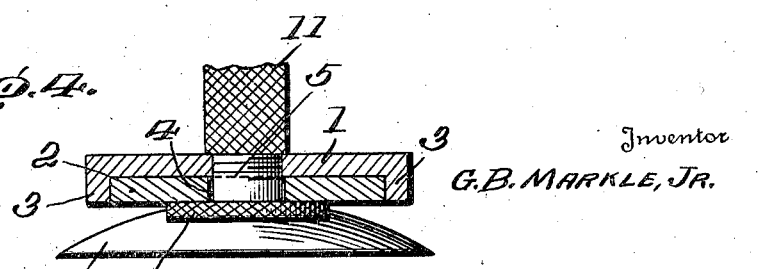
Inventor
G. B. MARKLE, JR.
By Pattison Wright & Pattison
Attorneys Patented Dec. 14, 1937

2,102,542

UNITED STATES PATENT OFFICE 2,102,542

DEVICE FOR HOLDING FOWLS AND THE LIKE

George B. Markle, Jr., Hazleton, Pa.

Application February 11, 1937, Serial No. 125,290

4 Claims. (Cl. 65—15)

This invention relates to certain new and useful improvements in a device for holding fowls and other cooked meat on a platter in order to prevent the same from moving or changing its position while being carved, the object being to provide a device which is adjustable so as to allow it to be adjusted to suit the size of the fowl or piece of meat being carved.

A further object of the invention is to provide a device consisting of a pair of members slidably connected together, each member being provided with a vacuum cup and a pin with means for locking the said members in adjusted position in respect to each other.

Other and further objects and advantages of the invention will be hereinafter set forth and the novel features thereof defined by the appended claims.

In the drawing,

Figure 1 is a top plan view of my improved holding device;

Figure 2 is a side elevation;

Figure 3 is a top plan view of a pair of my devices positioned within a platter for holding a fowl or piece of cooked meat; and Figure 4 is an enlarged section taken on line 4—4 of Figure 1.

In carrying out my invention I form an adjustable support of members 1 and 2, the member 1 having a channel portion 3 in which one end of the member 2 is slidably mounted and is provided with a slot 4 through which extends a screw 5 which is threaded into an opening 6 in the member 1 and is provided with a knurled head 6 so that by loosening the screw, the two members can be adjusted in position in respect to one another and by tightening the screw, they will be locked in their adjusted position.

The member 1 is provided with a vacuum cup 7 having a neck 8 extending into an opening formed in the member 1 so that it can be readily attached or detached to replace the vacuum cup and the member 2 is provided with a vacuum cup 9 having a neck 10 secured in an opening formed in the member 2 and these vacuum cups are preferably formed of rubber.

Extending upwardly from the members 1 and 2 are knurled pins 11 which are secured in the members 1 and 2 by swedging the same therein or providing the same with threaded stems working in threaded openings formed in the members 1 and 2.

In using my device, a pair of these devices are placed on a platter 12 as shown in Figure 3 transversely of the length of the platter and as each device is provided with two pins, the fowl or piece of meat will be pierced at four points when placed thereon and held securely on the platter so as to prevent the fowl or piece of cooked meat from slipping while being carved.

From the foregoing description it will be seen that I have provided a resilient means for holding the fowl or piece of meat to be carved on a platter to prevent the fowl or piece of meat from moving or changing its position while being carved which is so constructed that the resilient means in the form of vacuum cups, which are preferably formed of rubber, are non-injurious to silver or other metal platters and by employing such a construction all danger of the platter being injured in any way is prevented.

What I claim is:

1. A device of the kind described comprising a pair of flat members, one member being provided with flanges between which the other member is slidably mounted, means for locking said members in adjusted position in respect to each other, a knurled pin secured in each member and a vacuum cup arranged under each member and secured thereto.

2. A device of the kind described comprising a pair of members movably mounted in respect to each other, one member being provided with a slot and the other with a screw working in said slot for locking said members in adjusted position in respect to each other, a knurled pin extending upwardly from each member and a vacuum cup disposed under the end of each member and secured thereto.

3. A device of the kind described comprising a pair of flat members, one member being provided with flanges to form a guideway for the other member, one of said members being provided with a slot through which a screw working in a threaded bore of the other member passes, said screw being provided with a knurled head for operating the same to lock said members in adjusted position in respect to each other, each member being provided with an opening adjacent its end, a vacuum cup provided with a neck extending through said opening and a knurled pin extending upwardly from each member.

4. A device for holding fowls and the like comprising a pair of members slidably mounted in respect to each other, one member being provided with a slot and the other with a threaded opening, a headed screw extending through the slot of one member into the threaded opening of the other member for locking said members in adjusted position in respect to each other, each member being provided with an opening, a vacuum cup having a neck extending into each opening and a knurled pointed pin extending upwardly from each of said members.

GEORGE B. MARKLE, Jr.